United States Patent
Scholl et al.

(10) Patent No.: US 9,129,312 B1
(45) Date of Patent: *Sep. 8, 2015

(54) BIDDING ON PENDING, QUERY TERM-BASED ADVERTISING OPPORTUNITIES

(75) Inventors: Nathaniel B. Scholl, Seattle, WA (US); Stephan G. Betz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1799 days.

This patent is subject to a terminal disclaimer.

(21) Appl. No.: 11/043,499

(22) Filed: Jan. 25, 2005

Related U.S. Application Data

(63) Continuation of application No. 10/926,834, filed on Aug. 25, 2004, now abandoned.

(51) Int. Cl.
*G06Q 30/02* (2012.01)

(52) U.S. Cl.
CPC .................................. *G06Q 30/0275* (2013.01)

(58) Field of Classification Search
USPC ............................................. 705/14.1–14.73
See application file for complete search history.

(56) References Cited

U.S. PATENT DOCUMENTS

| | | | | |
|---|---|---|---|---|
| 6,078,866 | A * | 6/2000 | Buck et al. ......................... | 702/2 |
| 6,269,361 | B1 * | 7/2001 | Davis et al. ........................ | 707/3 |
| 6,826,572 | B2 * | 11/2004 | Colace et al. .................... | 707/10 |
| 6,978,263 | B2 * | 12/2005 | Soulanille ......................... | 707/3 |
| 7,043,450 | B2 * | 5/2006 | Velez et al. ...................... | 705/37 |
| 2003/0177265 | A1 | 9/2003 | Page et al. | |
| 2004/0133469 | A1 * | 7/2004 | Chang ............................. | 705/14 |
| 2004/0162757 | A1 * | 8/2004 | Pisaris-Henderson et al. . | 705/14 |
| 2005/0137939 | A1 * | 6/2005 | Calabria et al. ................. | 705/26 |
| 2005/0144068 | A1 * | 6/2005 | Calabria et al. ................. | 705/14 |
| 2005/0160002 | A1 * | 7/2005 | Roetter et al. .................. | 705/14 |
| 2005/0216335 | A1 | 9/2005 | Fikes et al. | |

FOREIGN PATENT DOCUMENTS

WO    WO98/34189    8/1998

OTHER PUBLICATIONS

"Bookmarklets: More, Useful Bookmarklets", http://web.archive.org/web/20021017094055/dooyoo-uk.tripod.com/bookmarklets2.html;, 2000, 3 pages.

Flanagan, David, "JavaScript Pocket Reference", 2nd Edition, O'Reilly & Associates, Inc, http://proquest.safaribooksonline.com/0596004117/jscriptpr2-CHP-2?refview=D, 2002, 10 pages.

(Continued)

*Primary Examiner* — Yehdega Retta
(74) *Attorney, Agent, or Firm* — Hogan Lovells US LLP

(57) ABSTRACT

A facility for bidding on a pending advertising opportunity is described. The facility receives at an advertiser a notification from a publisher. The notification contains keywords relating to a content request received by the publisher, and is sent by the publisher between its receipt of the content request and its dispatch of a content response responsive to the content request. In response to receiving the notification, the facility sends to the publisher a dynamic bid. The dynamic bid specifies an advertising message and a bid amount that the advertiser is willing to pay to present the advertising message in connection with a content response responsive to the content request produced by the publisher.

19 Claims, 6 Drawing Sheets

(56) References Cited

OTHER PUBLICATIONS

Ford, Jerry L., "Learn Javascript in a Weekend", Premier Press, http://proquest.safaribooksonline.com/159200086X?tocview=true, 2003, 7 pages.

Kangas, Steve, "About Bookmarklets: . . . answers to basic questions", http://web.archive.org/web/20021014090304/http://www.bookmarklets.com/about/, Aug. 30, 2003, 2 pages.

Lock, Matthew, "Wayback Machine Bookmarklet: Industrial Hypertext", http://web.archive.org/web/20020804000658/http://members.iinet.net.au/~iht/articles/wayback_bookmarklet.shtml, Aug. 4, 2002, 2 pages.

Shiran, Yehuda et al., "Bookmarklets", http://web.archive.org/web/19991118095959/www.webreference.com/js/column35/index.html, Nov. 18, 1999, 13 pages.

* cited by examiner

BIDDING ON PENDING, QUERY TERM-BASED ADVERTISING OPPORTUNITIES

CROSS-REFERENCE TO RELATED APPLICATION(S)

This application is a continuation of U.S. patent application Ser. No. 10/926,834 entitled "BIDDING ON PENDING, QUERY TERM-BASED ADVERTISING OPPORTUNITIES," filed on Aug. 25, 2004, now abandoned which application is hereby incorporated by reference in its entirety.

TECHNICAL FIELD

The present invention is directed to the field of on-line advertising, and, more particularly, to the field of techniques for bidding on on-line advertising opportunities.

BACKGROUND

Many search engine services, such as Google and Overture, provide for searching for information that is accessible via the Internet. These search engine services allow users to search for web pages and other Internet-accessible resources that may be of interest to users. After a user submits a search request that includes search terms, the search engine service identifies web pages that may be related to those search terms.

To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books.

When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results."

An advertiser who wants to place an advertisement along with certain search results provides a search engine service with a prospective advertising bid. Typical prospective advertising bids include (1) one or more search terms, (2) a bid amount, and (3) an advertising message. When a search request is received from a user, the search engine service identifies one or more of the already-received prospective advertising bids meeting certain criteria, such as those having the highest bid amounts among those including matching search terms, or those having the highest expected value among those including matching search terms. The engine service returns a search result in response to the received search request that includes the advertising messages of each of the identified prospective advertising bids. This search result, together with the included advertising messages, is displayed to the user.

Bidding on search result advertising opportunities using prospective advertising bids have a number of disadvantages for advertisers. First, it often requires a great deal of ongoing effort for an advertiser to select search terms and optimize its bids for these search terms. Second, there tends to be a practical limit to the number of search terms for which an advertiser can maintain prospective advertising bids. As a result, an advertiser often must forgo a large group of search terms, even though (1) the advertiser fully expects them to be included in one or more search queries received by a typical search engine and (2) the advertiser could benefit from bidding on them, because the overhead of bidding on them is too high relative to the likely benefit. Third, to effectively use prospective advertising bids, an advertiser must to be able to anticipate search terms that will be included in future search queries. If search engines receive a large number of queries including unexpected search terms, such as search terms relating to a news story or new product announcement, it can take an advertiser a substantial period of time to respond by submitting prospective advertising bids for these search terms, causing the advertiser to miss out on a substantial number of advertising opportunities. Fourth, prospective advertising bids typically do a poor job of differentiating between individual advertising opportunities in which the query contains the same search term, such as search requests received from different individual users, some of whom are good prospects and other of whom are poor prospects; search requests received on different days or at different times; search requests specifying different combinations of search terms; search requests including particular query constructs, such as Boolean operators; search requests received at a time when an advertised item is out of stock; etc.

An approach to seeking search result advertising opportunities that overcame some or all of these disadvantages of prospective advertising bids would have significant utility.

DETAILED DESCRIPTION

Figure 1:
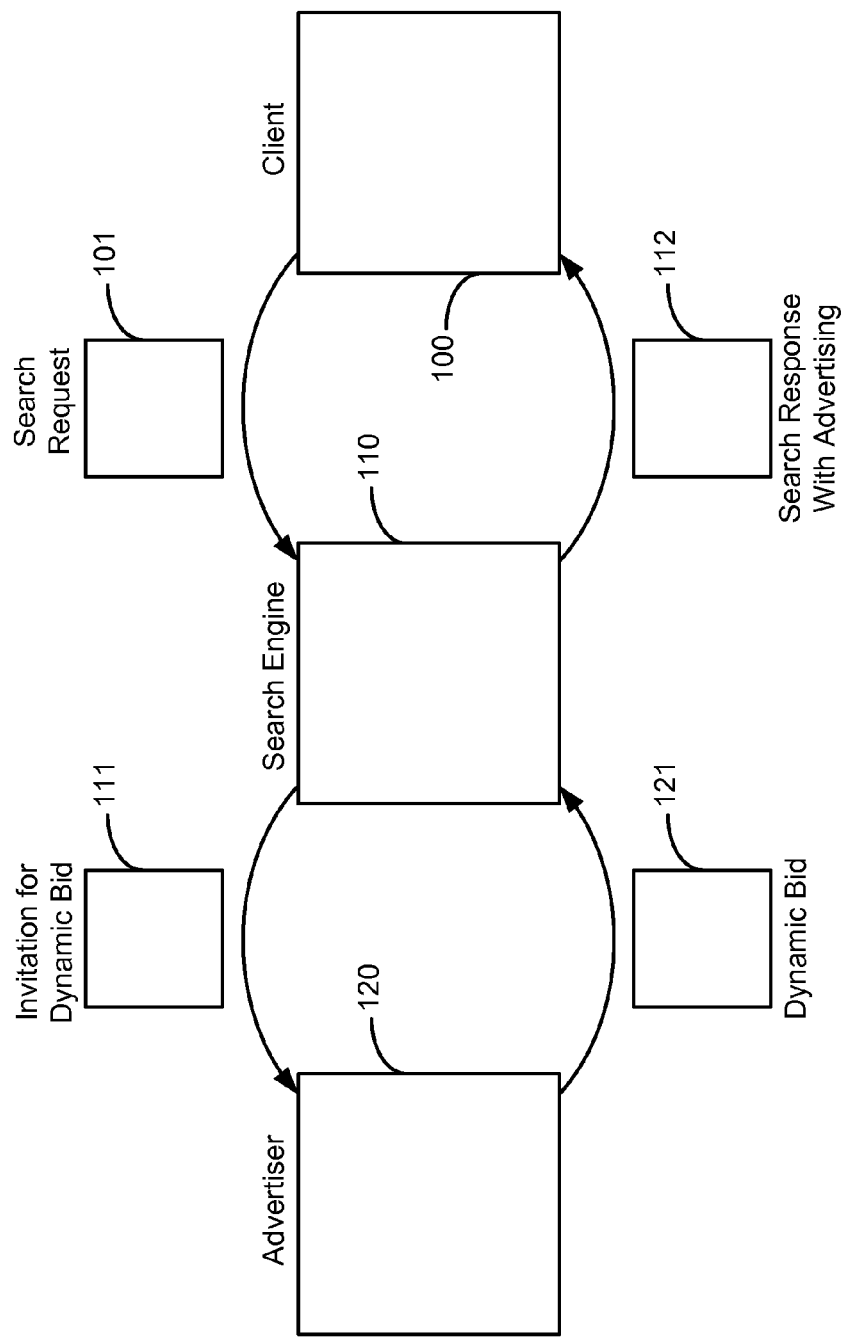
FIG. 1 is a data flow diagram showing a typical data flow performed in accordance with the facility.

A software facility to support bidding on pending query-based advertising opportunities is described. In accordance with the facility, when a search engine receives a search request containing a search query—the search engine sends an invitation for dynamic bid containing a set of keywords from the search query to one or more advertisers. When an advertiser receives an invitation, the advertiser analyzes the keywords, and determines whether it wishes to submit a dynamic bid to include an advertising message in the search result returned by the search engine in response to the query. If so, the advertiser responds to the notification with a dynamic bid specifying a bid amount and an advertising message. If the search engine accepts the dynamic bid, it includes the specified advertising message in the search result returned by the search engine in response to the query.

In some embodiments, the advertiser considers an invitation for dynamic bid by applying the keywords against its own item catalog or other database of advertising subject information to identify an item or a category of items that can be purchased or otherwise obtained from the advertiser and that relate to the search query. In some embodiments, the facility constructs a custom advertising message featuring the identified item or category that is specifically responsive to the notification, such as the time at which it is received, the language in which the search query is expressed, information about the user's identity or characteristics, information about the amounts of already-known bids, etc. In some embodiments, the facility selects a bid amount based upon the profitability of the item, the historical effectiveness of advertising on the notifying search engine, information about the user's identity or characteristics, etc.

In some embodiments, a single search engine can send a notification of a single search request to multiple advertisers. In some embodiments, search engines receive search requests from users via an intermediate search engine user interface, and/or return search responses to users via a search engine user interface. In some embodiments, a single advertiser can register to receive notifications from multiple search engines.

In some embodiments, the search engine can compare a bid received in response to a notification against (1) other bids received in response to the same notification, (2) other cached bids received in response to earlier notifications having similar queries, (3) earlier-received conventional prospective bids, or any combination thereof. In some embodiments, the facility enables an advertiser to invalidate one or more of its cached bids before they expire.

In some embodiments, advertisers can provide criteria in advance about the kinds of search requests for which they wish to receive invitations, such as advertiser-side "stop words" that, if they appear in a search query, should prevent a notification from being sent to a particular advertiser. As another example, an advertiser can specify to receive invitations for particular types of search requests received at the search engine, such as product price searches. In some embodiments, search engines can provide criteria in advance about the kinds of search requests for which the search engine will send invitations to all advertisers or individual advertisers, such as search engine-side stop words that, if they appear in a search query, should prevent a notification from being sent to selected advertisers or all advertisers. In some embodiments, search engines include additional information in the notifications to assist the advertisers in the decisions of whether to bid, the amount to bid, what to advertise, how to construct the advertising message, etc. In some embodiments, an advertiser can include in its response an indication that its bid should be cached by the search engine for a certain period of time, in order to reduce the overhead to the search engine and advertiser of communicating in response to every search request.

By facilitating bidding on pending query-based advertising opportunities in some or all of the ways described above, the facility enables advertisers to more effectively use query-based advertising. Also, the facility may enable a search engine to reduce its level of overhead for query-based advertising, increase revenues from query-based advertising, and/or make query-based advertising messages more relevant to and appreciated by its users.

FIG. 1 is a data flow diagram showing a typical data flow performed in accordance with the facility. A client computer system 100 sends a search request 101 to a search engine computer system 110. Table 1 below shows a sample search request.

TABLE 1 senderIP address: 192.0.34.166
sender cookie: 07351928
query: insulated squeeze bottle The sample search request includes a sender IP address of the client computer system, a cookie stored for the search engine domain on the client computer system, and a search query. Those skilled in the art will appreciate that the sample search request shown in Table 1 above, as well as the data structures shown in additional tables below, are merely exemplary, and that embodiments of the facility may use corresponding data structures having more, less, or different content, organized, formatted, and/or encoded in various ways. In particular, certain data items shown may be optional to provide, or universally excluded.

The search engine computer system in turn sends an invitation for dynamic bid 111—also called "search notification"—to an advertiser computer system 120. In some embodiments, the search engine computer system may send invitations corresponding to the search request to the advertiser computer systems of multiple advertisers. In some embodiments, the search engine computer systems of multiple search engines may send search invitations to the same advertiser computer system. A sample invitation for dynamic bid is shown below in Table 2.

TABLE 2 publisher ID: 024
notification ID: 273692
present high bid: $0.05
profile: interest: oceanography
sender IP address: 192.0.34.167
sender cookie: 07351928
query: insulated squeeze bottle In addition to the information in the sample search request, the sample search notification includes a publisher ID identifying the publisher sending the notification, a notification ID identifying the notification, an indication of the present high bid to advertise in the result for the search request, and profile information retrieved by the search engine using the sender IP address and/or the sender cookie.

In some cases, in response to the search notification, the advertiser computer system sends the search engine computer system a notification response—also called a "dynamic bid"—121 containing a bid for including an advertising message in a search result generated for the client computer system by the search engine computer system. Table 3 below shows a sample notification response.

TABLE 3 advertiser ID: 1129
bid ID: 4697324
notification ID: 273692
bid amount: $0.15
cache period: 7 days
advertising message: <advertising message>
hyperlink: http://www.example.com/item297432.asp The sample notification response includes an advertiser ID identifying the advertiser, a bid ID identifying the bid represented by the notification response, a bid amount, a period for which the bid is to be cached by the search engine, an advertising message, and a hyperlink that is to be traversed if the user clicks on the advertising message.

Based in part on the notification response, the search engine computer system composes a search result web page 112—also called a "search response"—potentially including an advertising message specified by the bid in the notification response. This search result is returned to the client computer system for display. Table 4 below shows a sample search response.

TABLE 4

<search result>
<advertising message>
http://www.example.com/item297432.asp

The sample search response includes a search result, the advertising message, and the hyperlink.

While various functionalities and data are shown in FIG. 1—and in FIG. 7, discussed below—as residing on particular computer systems that are arranged in a particular way, those skilled in the art will appreciate that such functionalities and data may be distributed in various other ways across computer systems in different arrangements.

Figure 2:
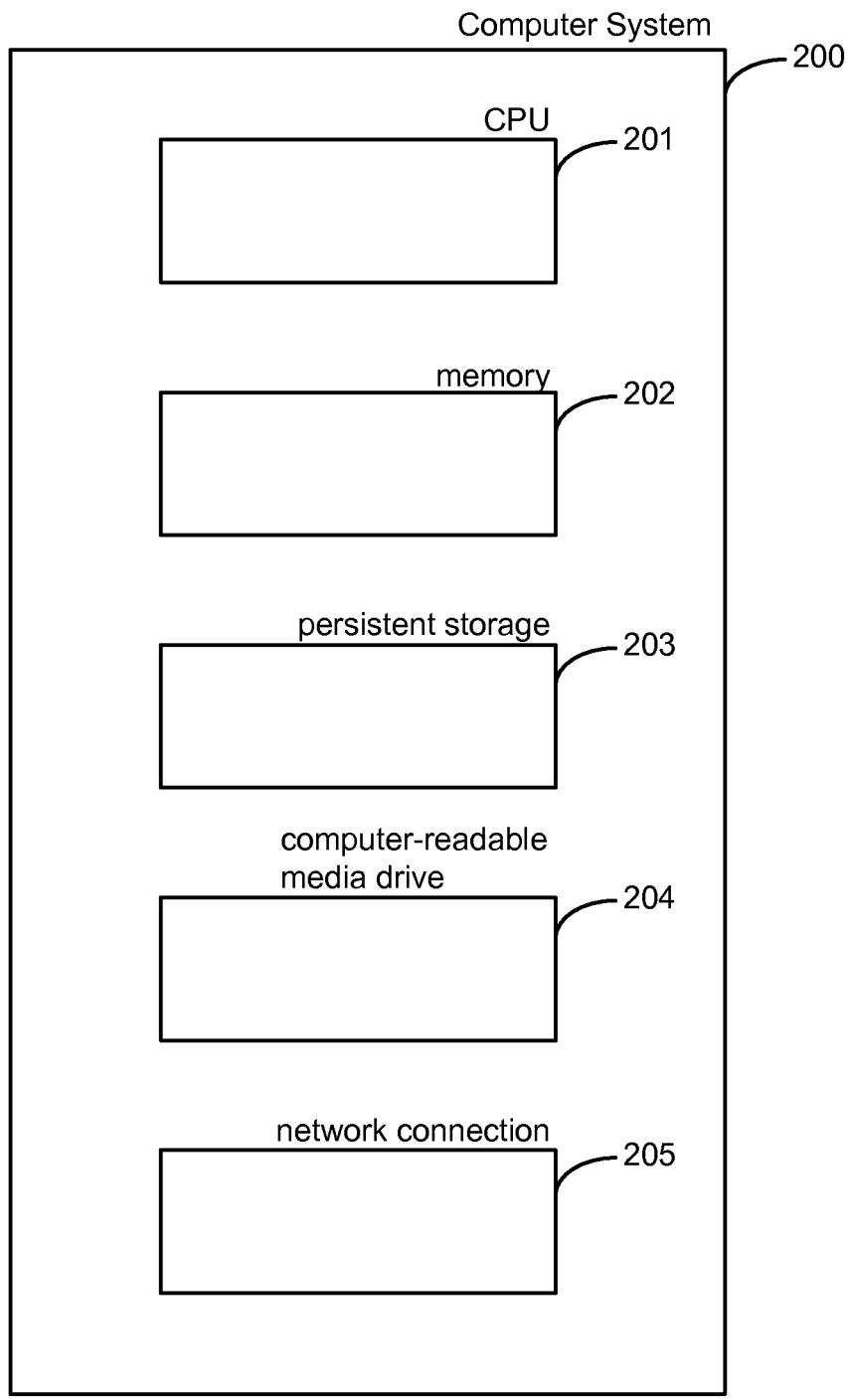
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 3:
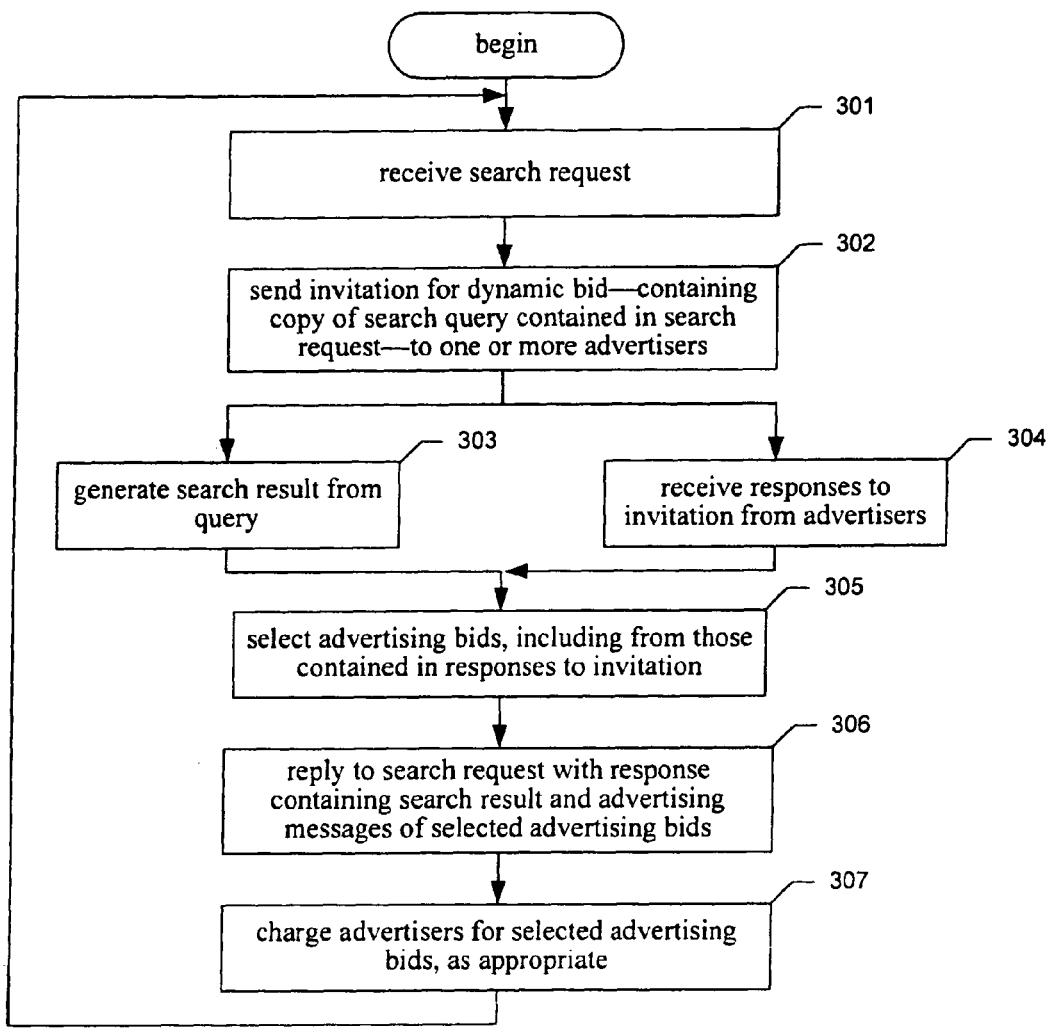
FIG. 3 is a flow diagram showing steps typically performed by the facility to process a search request.

FIG. 3 is a flow diagram showing steps typically performed by the facility to process a search request. These steps are typically performed by the facility in the search engine computer system. In step 301, the facility receives the search request from the client computer system. In step 302, the facility sends an invitation for dynamic bid on the search request received in step 301 to one or more advertisers. The sent invitations each contain a copy of the search query contained in the search request. In some embodiments, the facility uses a "stop list" of search terms specified by each advertiser that, if they occur in a search query, should preclude the sending of an invitation to the advertiser. In some embodiments, the facility uses a similar list of search terms specified by each advertiser that, when they appear in queries, should cause an invitation to be sent to the advertiser. In some embodiments, the facility uses an indication of types of queries specified by each advertiser that causes an invitation for dynamic bid to be sent to the advertiser only for queries of these types. In some embodiments, the facility uses a stop list or other control mechanism specified by the search engine to determine whether selected or all advertisers receive invitations for dynamic bid for particular queries. In some embodiments, before sending an invitation to a particular advertiser in step 302, the facility checks a cache of dynamic bids earlier submitted by the advertiser that may match the current search query. If an unexpired cached dynamic bid matches the current search query, the facility omits to send an invitation to the advertiser in step 302, and rather uses the cached dynamic bid for that advertiser. In some embodiments, where the facility uses a cached dynamic bid, the search engine asynchronously notifies the advertiser that the cached dynamic bid was used.

After step 302, the facility performs steps 303 and 304 in parallel. In step 303, the facility generates a search result based upon the query contained in the search request. In step 304, the facility receives dynamic bids in response to the invitation sent in step 302 from advertisers. Where a response to the invitation received in step 304 from a particular advertiser specifies that the contained dynamic bid be cached by the search engine, this dynamic is added to a dynamic bid cache maintained by the search engine. In some embodiments, an advertiser-specified caching duration or a default caching duration is used to determine how long a cached dynamic bid will remain in the cache. In some embodiments (now shown), the facility enables advertisers to send instructions to the search engine to invalidate one or more dynamic bids before their caching durations elapse.

After performing steps 303 and 304, the facility continues in step 305. In step 305, the facility selects one or more advertising bids for inclusion with the search result. The selected advertising bids may be among the bids received in the responses to the notification, cached bids from responses to earlier notifications, and/or earlier-received prospective bids. Bids may be selected in a variety of ways, such as by highest bid amount, highest expected value based upon bid amount and historical performance of advertising messages from each advertiser, etc. In step 306, the facility replies to the search request received in step 301 with a response containing the search result generated in step 303 and the advertising messages specified by the advertising bids selected in step 305. In step 307, the facility charges the advertisers for the selected advertising bids, as appropriate. For example, for bids specifying an amount for the presentation of an advertising message, advertisers are billed immediately. For bids specifying an amount for a click-through from a presented advertising message, the advertiser is charged if and when the presented advertising message is clicked-through. In some embodiments, the facility also notifies advertisers sending dynamic bids of the outcome of the auction, such as by indicating whether the advertiser's bid won the auction, or by providing information about the winning bid or bids. After step 307, the facility continues in step 301 to receive the next search request.

Figure 4:
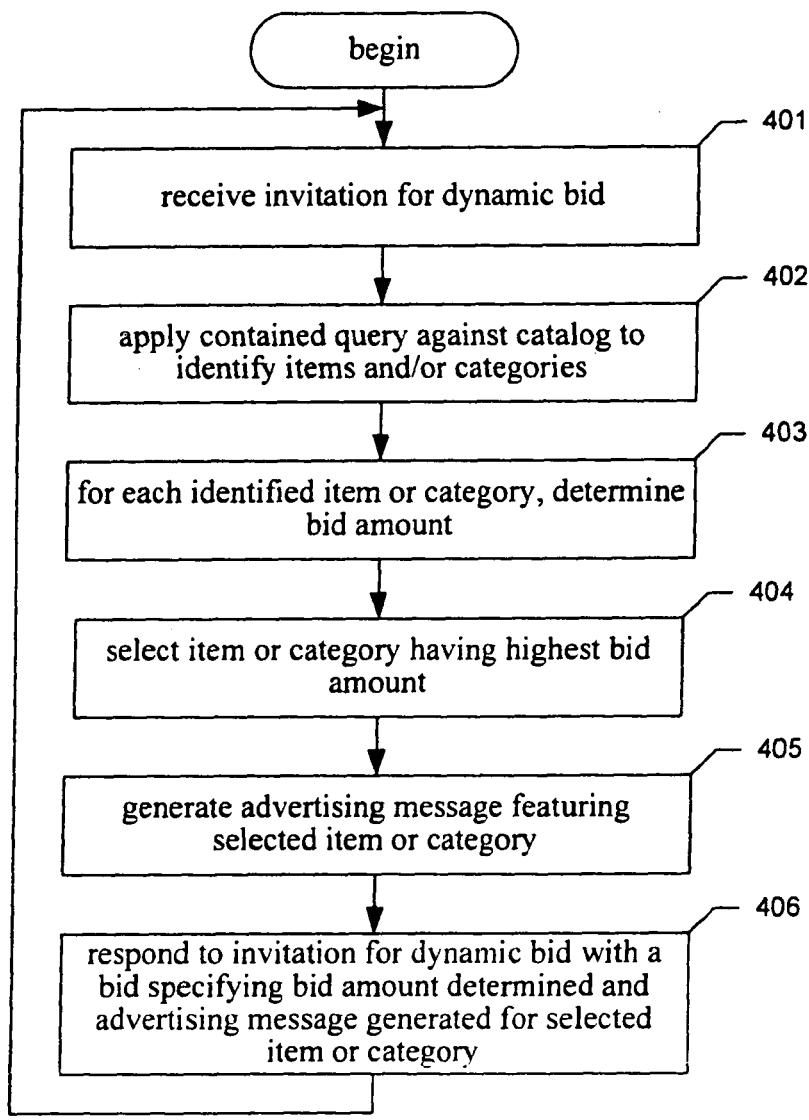
FIG. 4 is a flow diagram showing steps typically performed by the facility in the advertising computer system to process a search request notification.

FIG. 4 is a flow diagram showing steps typically performed by the facility in the advertising computer system to process a search request notification. In step 401, the facility receives an invitation for dynamic bid from a search engine computer system. In step 402, the facility applies the query contained in the invitation for dynamic bid received in step 401 against advertising subject database used by the advertiser. For example, where the advertiser is a merchant, the facility may apply the query against a catalog of items available from the merchant and/or categories thereof to identify items and/or categories to which the query relates. As another example, the facility may apply the query against a list of user wish lists established with a merchant by users. As another example, the facility could consider the seasonality of items or categories matching the query. In some embodiments, the facility applies the query using query operators included in the query, and/or query fields specified for query terms included in the query. In some embodiments, the facility applies the query in a manner that is based upon a type specified for the query, such as an image query, a product price query, etc. In some embodiments, where large number of different items are identified as matching the query, the facility may choose to advertise a category of items rather than an individual item.

In step 403, the facility determines a bid amount for each item or category identified in step 402. The facility may use a wide variety of approaches to determining a bid amount for an item or category. For example, bid amount can be based upon a computation of expected value of placing the advertising message, such as the item or category's margin, conversion-adjusted margin, time-based promotion status, inventory level, seasonality, etc. A bid amount may also be based upon competitiveness and/or budgetary considerations. Some techniques used by embodiments of the facility are described in one or more of the following: U.S. patent application Ser. No. 10/748,759, entitled METHOD AND SYSTEM FOR GENERATING AND PLACING KEYWORD-TARGETED ADVERTISEMENTS, filed on Dec. 30, 2003; U.S. patent application Ser. No. 10/914,722, filed on Aug. 9, 2004, entitled METHOD AND SYSTEM FOR IDENTIFYING KEYWORDS FOR USE IN PLACING KEYWORD-TARGETED ADVERTISEMENTS; and U.S. patent application Ser. No. 10/917,227, filed on Aug. 12, 2004, entitled METHOD AND SYSTEM FOR REDUCING BID AMOUNTS OF ADVERTISING BIDS, each of which is hereby incorporated by reference in its entirety.

In step 404, the facility selects the item or category having the highest bid amount, otherwise having the highest expected value, or best satisfying other criteria. In some embodiments, rather than determining the bid amount for each identified item or category in step 403, then selecting an item in step 404 as shown, the facility instead first selects an item or category, then determines a bid amount only for the selected item or category.

In step 405, the facility generates an advertising message featuring the selected item or category. In some embodiments, the facility uses an advertising message template to generate an advertising message, as discussed further below in conjunction with FIG. 6. In an alternative embodiment (not shown), the facility instead selects a pre-existing advertising message featuring the selected item or category. In step 406, the facility responds to the invitation for dynamic bid with a dynamic bid that specifies the bid amount determined for the selected item or category in step 403 and the advertising message generated for the selected item or category in step 405. In some embodiments, the dynamic bid further specifies a hyperlink, such as a URL, that the user will traverse if the user clicks on the advertising message or a portion thereof. As examples, the hyperlink may lead to a product or other item, a product or item group, a search of products, items, or groups, etc. After step 406, the facility continues in step 401 to receive the next search request notification.

Figure 5:
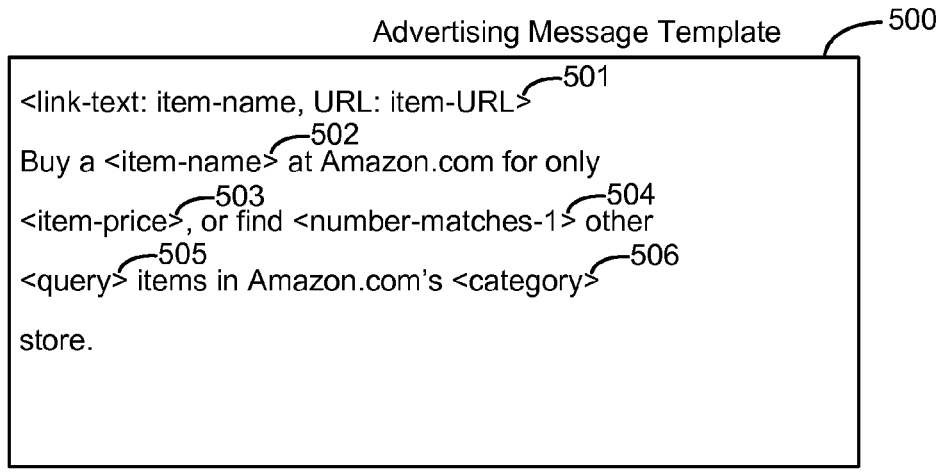
FIG. 5 is a data structure diagram showing a sample template used to generate a custom advertising message.

FIG. 5 is a data structure diagram showing a sample template used to generate a custom advertising message. The template 500 includes text, as well as substitution tags 501-506. In order to generate a custom advertising message from the advertising message template, the facility replaces each substitution tag with information specified by the substitution tag. Substitution tags may refer to, for example; information from the advertiser's catalog, some or all of the search query, contents of the notification other than the query, information looked up based upon contents of the notification (such as user profile information looked up based upon user identity or geographic location looked up based upon IP address), etc.

Figure 6:
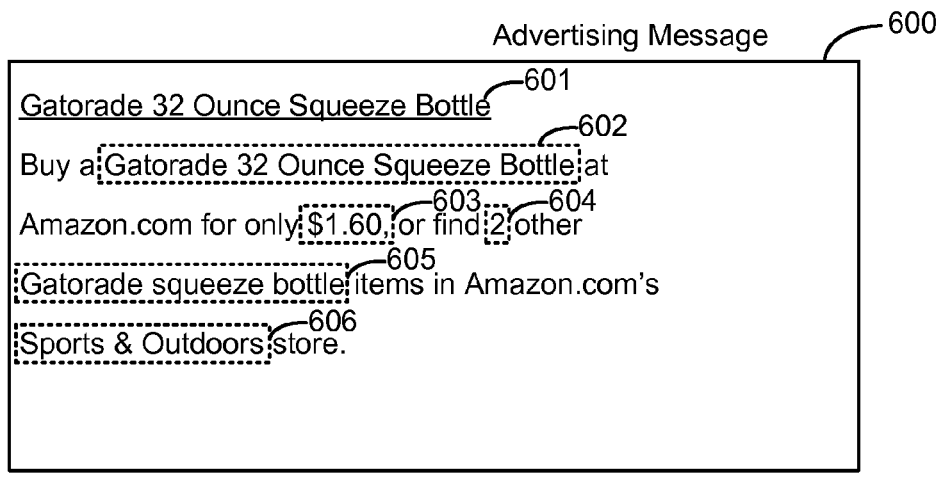
FIG. 6 is a data structure diagram showing an advertising message constructed using the advertising message template shown in FIG. 5.

FIG. 6 is a data structure diagram showing an advertising message constructed using the advertising message template shown in FIG. 5. It can be seen that link substitution tag 501, specifying a link name and a link URL, has been replaced with an actual link 601 in the advertising message having the specified text and URL. Substitution tags 502-506 have similarly been replaced with information they specify. In some embodiments (not shown), the substitution tags in a template may specify rich media elements, such as images, sounds, video, audio video, slide shows, etc. These rich media elements can be included in the corresponding advertising message either by value or by reference. The facility may select rich media elements from a supply of preexisting rich media elements, or dynamically compose or composite the rich media elements. The advertising message may be expressed in either textual or binary form.

Figure 7:
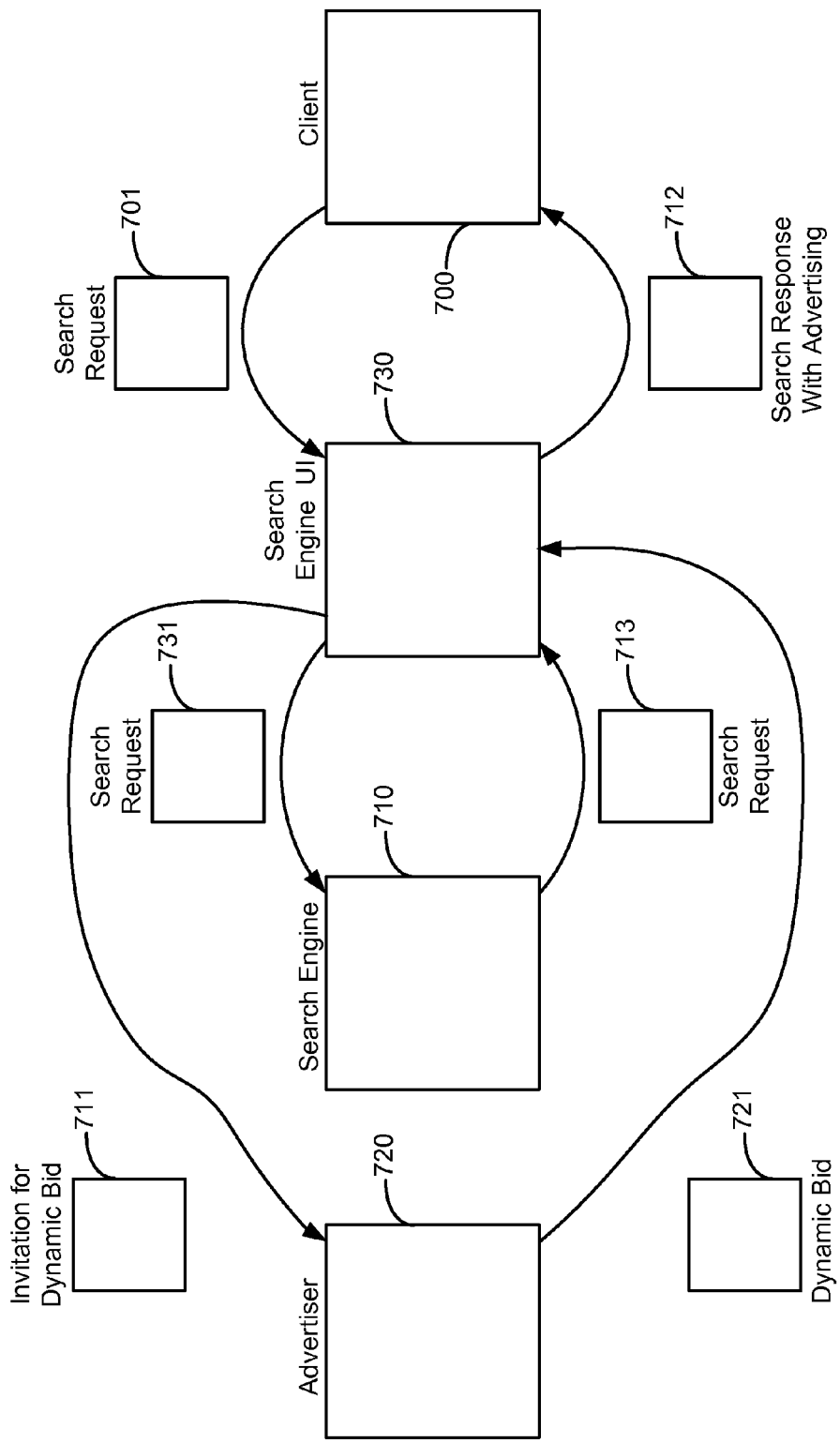
FIG. 7 is a data flow diagram showing an alternative typical data flow performed in accordance with the facility.

FIG. 7 is a data flow diagram showing an alternative typical data flow performed in accordance with the facility. The data flow shown in FIG. 7 is similar to that shown in FIG. 1, except that the initial search request 701 is submitted by the client computer system 700 to a search engine user interface computer system 730. This may occur, for instance, where a publisher offers searching services to its users, which it provides using a syndicated search service exposed via the search engine computer system. When the search engine user interface computer system receives the search request, it (a) forwards a copy 731 of the search request to the search engine to generate a search result, and (b) sends an invitation for dynamic bid 711 to the advertiser 720. The search request 731 sent from the search engine user interface computer system to the search engine computer system may be a copy of the search request 701 sent from the client computer system to the search engine user interface computer system, or may be derived from search request 701 in a variety of other ways.

In response to search request 731, the search engine computer system sends the search engine user interface computer system a search result 713 responsive to the search request. When the advertiser computer system receives the invitation for dynamic bid, it sends the dynamic bid 721 to the search engine user interface computer system. When the search engine user interface computer system receives the search result and dynamic bid, the search engine user interface computer system determines whether to accept the dynamic bid. If so, the advertising message specified by the dynamic bid is incorporated together with the search result in a search response 712 that is sent from the search engine user interface computer system to the client computer system.

In some embodiments—such as where an advertiser has prearranged a bid amount with the search engine—an advertiser may send a dynamic bid not explicitly specifying a bid amount. In some embodiments, the facility may send invitations for dynamic bids in response to receiving content requests other than search requests at a search engine or other publisher. In some embodiments, the facility sends invitations for dynamic bids containing sets of keywords other than copies of search queries, such as a proper subset of the keywords in a search query, a set of keywords derived from the keywords in a search query, or a set of keywords generated by parsing of body of text associated with the search request or other content request.

It will be appreciated by those skilled in the art that the above-described facility may be straightforwardly adapted or extended in various ways. For example, the facility may be used in conjunction with a wide variety of query types and query contents. The facility may use a variety of techniques to select items, item categories, or other subjects for advertising by the advertiser; to select and/or generate advertising messages; and to select bid amounts. The search engine may use a variety of techniques to select advertising bids, including advertising bids contained in live notification responses, cached notification responses, and earlier-received prospective advertising bids. While the foregoing description makes reference to preferred embodiments, the scope of the invention is defined solely by the claims that follow and the elements recited therein.

We claim:

1. A method in a computing system for auctioning pending query-based advertising opportunities, comprising:
   receiving at a search engine computer system a search request from a client computer system, said search request containing a search query;
   in the search engine computer system, in response to receiving the transmitted search request:
      transmitting notifications of the search request containing the search query contained by the search request and a current high bid price in a pending auction for the search query to one or more advertiser computer systems;
      generating a search result using the search query;
   in at least a distinguished one of the advertiser computer systems, in response to receiving a transmitted notification:
      determining to bid for placement of an advertising message in connection with the search result generated for the search query in response to the search request;
      designating an advertising message;
      designating an advertising hyperlink;
      determining a bid amount; and
      transmitting a dynamic bid to the search engine computer system specifying the designated advertising message, the designated advertising hyperlink, and the determined bid amount;
   in the search engine computer system, at a time after transmitting the notifications:
      comparing dynamic bids received subsequent to receipt of the search request to each other and to any static bids received prior to receipt of the search request matching the search query to select one or more bids;
      creating a response to the search request containing the generated search result and, for each selected one or more bids, the advertising message and advertising hyperlink specified by the selected bid; and
      transmitting the created response to the search request to the client computer system.

2. A method for auctioning advertising opportunities, comprising:
   receiving, at a search engine computer system, a search request from a user computer device, the search request specifying a search query;
   applying the search request to an index of the search engine computer system to produce a search result;
   in response to receiving the search request, sending to an advertiser computer system a dynamic bid solicitation containing a copy of the search query and a current high bid price in a pending auction for including an advertisement in a response to the search request generated by the search engine computer system to include at least a portion of the search result;
   after sending the advertiser computer system the dynamic bid solicitation, receiving from the advertiser computer system a dynamic bid specifying a bid amount and an advertising message to be included in the response to the search request in exchange for said bid amount;
   comparing the dynamic bid to other bids applicable to the search request at the search engine computer system; and
   based upon the comparison, determining whether to include the specified advertising message in the search response.

3. A computing system for auctioning advertising opportunities, comprising:
   a first receiver that receives a search request from a user, the search request specifying a search query;
   a search engine that applies the search request to an index to produce a search result;
   a sender that, in response to receiving the search request, sends an advertiser computer system a dynamic bid solicitation containing a copy of the search query and a current high bid price in a pending auction for including an advertisement in a response to the search request generated by the search engine;
   a second receiver that, after sending the advertiser computer system the dynamic bid solicitation, receives from the advertiser computer system a dynamic bid specifying a bid amount and an advertising message to be included in the response to the search request in exchange for said bid amount;
   a comparison subsystem that compares the dynamic bid to other bids applicable to the search request; and
   a search response generation subsystem that, based upon the comparison, determines whether to include the specified advertising message in a search response.

4. A method for allocating advertising opportunities, comprising:
   when a content request is received from a user computing device to a search engine computer system, sending an advertiser computer system a dynamic bid invitation containing keywords relating to the content request and a current high bid price in a pending auction for including an advertisement in a response to the content request generated by the search engine computer system;
   after sending the advertiser computer system a dynamic bid invitation containing keywords relating to the content request, receiving from the advertiser computer system to the search engine computer system a dynamic bid specifying a bid amount and an advertising message to be included in the response to the content request in exchange for said bid amount;
   comparing the dynamic bid to other bids applicable to the content request using the search engine computer system; and based upon the comparison, determining whether to include the specified advertising message in the content response.

5. The method of claim 4 wherein the received content request is a search request specifying a search query.

6. The method of claim 4, wherein the sent dynamic bid invitation containing keywords relating to the content request includes keywords included in the search query.

7. The method of claim 4, wherein the dynamic bid invitation is sent to the advertiser computer system only where the set of keywords do not match a list of prohibited terms specified by a content provider that received the content request.

8. The method of claim 4 wherein the dynamic bid invitation is sent to the advertiser computer system only where the set of keywords do not match a list of prohibited terms specified by the advertiser computer system.

9. The method of claim 4 wherein the dynamic bid invitation is sent to the advertiser computer system only where the set of keywords matches a list of necessary terms specified by the advertiser computer system.

10. The method of claim 4, further comprising reviewing cached dynamic bids earlier received from the advertiser computer system, and wherein the dynamic bid invitation is sent to the advertiser computer system only where the set of keywords does not match sets of keywords associated with the cached dynamic bids, and wherein, where the set of keywords matches a set of keywords associated with a distinguished cached dynamic bid, the distinguished cached dynamic bid is compared with other bids applicable to the content request.

11. The method of claim 4, further comprising adding the received dynamic bid to a cache of earlier-received dynamic bids.

12. The method of claim 11, further comprising removing the received dynamic bid from the cache in response to an asynchronous request from the advertiser computer system.

13. The method of claim 11, further comprising transmitting a report of dynamic bids received from the advertiser computer system that are active in the cache.

14. The method of claim 4, further comprising notifying the advertiser computer system that, based at least in part on the received dynamic bid, the specified advertising message was included in a search response generated in response to the search request.

15. The method of claim 4, further comprising notifying the advertiser computer system of characteristics of a bid other than the received dynamic bid for which an advertising message was included in a search response generated in response to the search request.

16. The method of claim 4 wherein a dynamic bid invitation is sent to a plurality of distinguished advertiser computer systems.

17. The method of claim 4 wherein one of the other bids applicable to the content request to which the dynamic bid is compared is a second dynamic bid.

18. The method of claim 4 wherein one of the other bids applicable to the content request to which the dynamic bid is compared is a prospective bid.

19. A non-transitory computer-readable medium whose contents cause a computing system to perform a method for auctioning advertising opportunities, the method comprising:

when a search request specifying a search query is received, sending an advertiser computer system one or more keywords contained in the search query;

after sending the advertiser computer system a copy of the search query, receiving from the advertiser computer system a dynamic bid specifying a bid amount for a pending auction for said one or more keywords and specifying an advertising message;

comparing the dynamic bid to other bids applicable to the search request; and based upon the comparison, including the specified advertising message in a search response generated in response to the search request.

\* \* \* \* \*